UNITED STATES PATENT OFFICE 2,238,347

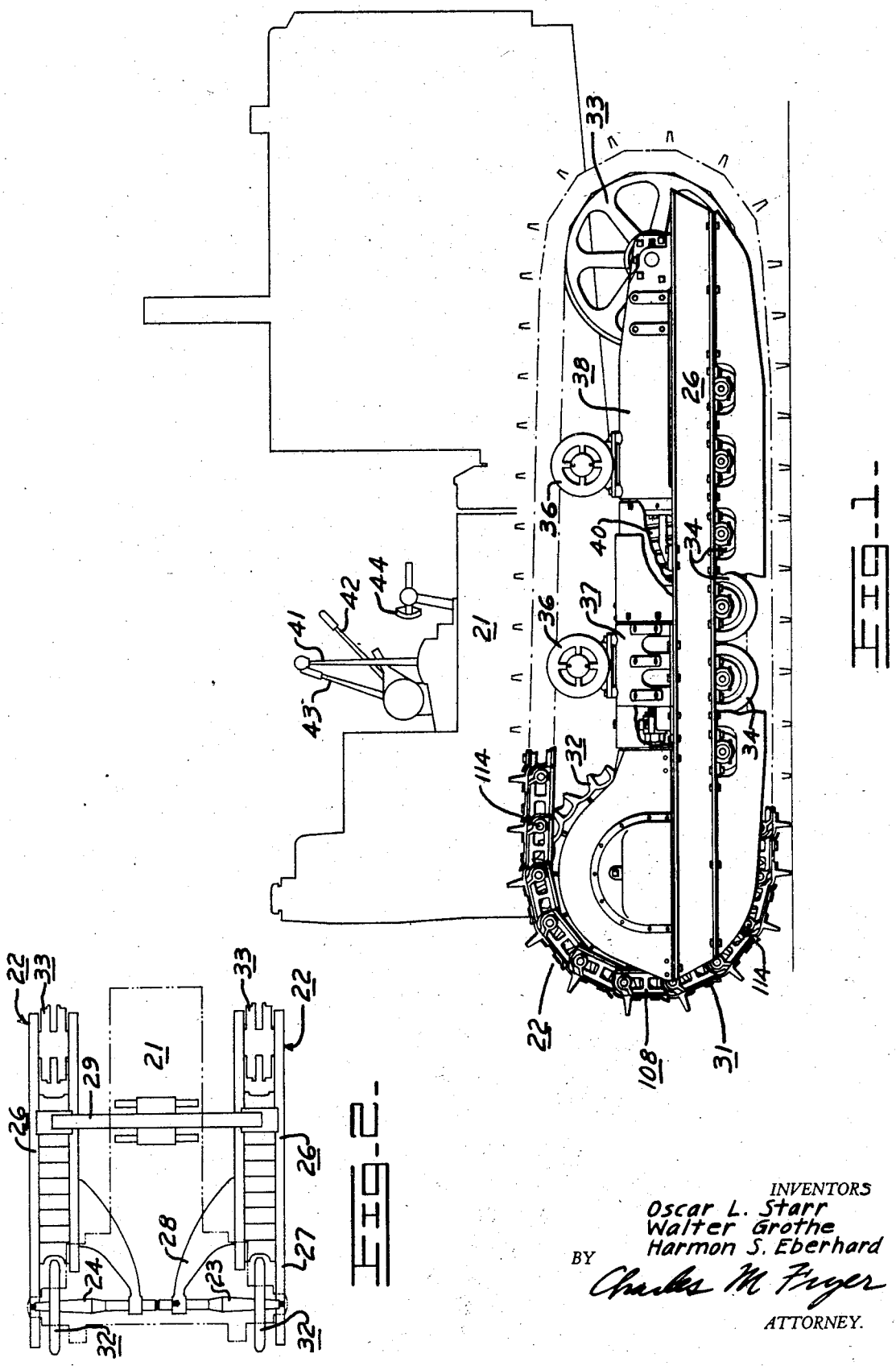

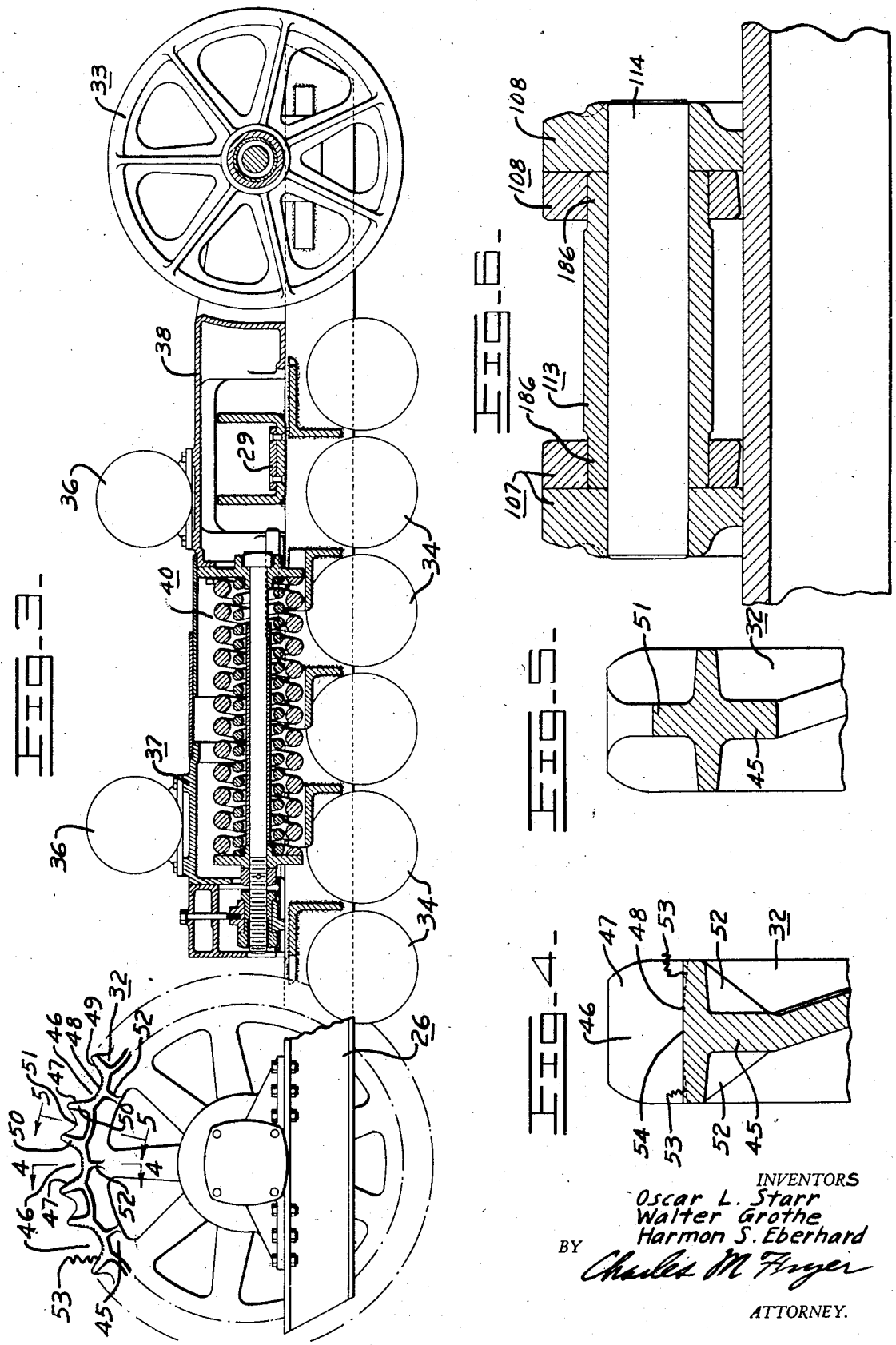

SPROCKET WHEEL

Oscar L. Starr, Mission San Jose, and Walter Grothe, Alameda, Calif., and Harmon S. Eberhard, Peoria, Ill., assignors to Caterpillar Tractor Co., San Leandro, Calif., a corporation of California Original application August 25, 1934, Serial No. 741,388. Divided and this application February 27, 1939, Serial No. 258,618

4 Claims. (Cl. 74—243)

This invention relates to a sprocket wheel, and more particularly to a driving sprocket wheel in a self-laying endless track mechanism of a track-type vehicle, such as a tractor. The present application is a division of our copending application, Serial No. 741,388 for "Endless track mechanism," filed August 25, 1934 now Patent No. 2,168,053.

The problem of providing a satisfactory endless track mechanism for track-type vehicles, which will have long life, presents many difficulties; and from a consideration of the following description of the construction and operation of such mechanism, it will become apparent that many factors must be considered in evolving a satisfactory track mechanism of this type.

Track-type vehicles, such as tractors, include generally a main frame or body which is movably mounted upon a pair of spaced endless track mechanisms, by means of pivotal connections and by an equalizing mechanism. The mounting provides for independent pivotal movement in an upright plane of each track mechanism with respect to the tractor main frame or body; the equalizing means serving to equalize and restrain such movements. In addition to a track or truck frame usually forming part of each track mechanism, each track mechanism includes an endless track about each track frame; and track rollers or wheels journaled on the track frame run on the ground stretch of the endless track to support the weight of the tractor thereon. The tractor is propelled over the tracks by a pair of driving sprockets, each of which is driven by final drive mechanism and is at the rear of the associated track frame; the sprockets serving to pick up the tracks as the track frames of the tractor are propelled thereover. At the front of each track frame, an idler wheel is provided to support and guide the track as it is being continuously laid in front of the track rollers; the upper stretch of the track between the driving sprocket and the idler wheel being supported, if desirable, by track carrier rollers. The front idler of each track mechanism is usually movably mounted on the associated track frame so that it can move if the track becomes clogged, to prevent breakage; such movement of the idler being usually controlled by a suitable recoil mechanism. Each endless track comprises a series of link assemblies pivotally connected together and providing spaced rails which are engaged by the track rollers and the front idler wheel; and the link assemblies are engaged by the associated driving sprocket, in a manner later described, to provide for propulsion of the tractor.

The driving sprockets for the respective track mechanisms are usually independently driven from the power plant of the tractor, through selectively releasable connections to enable steering of the tractor in the usual manner by disengaging the drive to a selected track mechanism. To accomplish sharp turning in steering, track brakes are preferably provided so that each track mechanism can be locked against free movement when the drive therefor is disengaged. It is, thus seen that when a track-type tractor is turned, the locked track mechanism is subjected to twisting forces by virtue of its engagement with the ground. Hence, severe stresses are transmitted through the track link assemblies.

Each track link assembly generally includes a pair of oppositely disposed spaced track links providing spaced rails for engagement by the track rollers. To enable pivotal connection of the ends of the links of adjacent link assemblies, each link is usually formed with an intermediate portion of full rail width, and with end portions of reduced width. In the connected link assemblies, the links are so arranged as to provide butt-lap rail joints; each joint being characterized by overlapping of the link end portions of reduced width. The pivotal connections between the track link assemblies usually comprise a bushing connected to the reduced width end portions of the links of each assembly and a pin connected to the adjacent reduced width end portions of the adjacent link assembly; each pin being journaled in the bushing of the adjacent track link assembly. Thus, each endless track comprises an endless series of pairs of oppositely spaced links pivotally connected end to end and forming spaced rails for engagement with the track rollers and the front idler wheel. The link-connecting bushings are engaged by the driving sprocket to provide for laying of the track and propulsion of the vehicle along the ground stretch of track as it is being laid.

In track mechanism, of the character described, it is desirable to have the portions of the bushings located between the rails, of as large diameter as is practicably possible to provide large bearing surfaces for engagement with the driving sprocket so as to enhance wear and provide strength; and to permit bushings of such large diameter without increasing the overall depth of the track, which would result in increase in weight and raising of the pitch line of the track, we provide bushings only of enlarged diameter between the links and having ends of reduced diameter fitting within the links. In order to take full advantage of the enlarged diameter bushings, we provide tooth spaces on the driving sprocket which are of substantially full bearing width, namely an active bearing width substantially equal to the distance between the inner faces of the links forming the spaced rails.

For a given size of track mechanism, in which enlarged bushings are employed, having ends of reduced diameter which do not change the pitch of the link assemblies (i. e. the distance between adjacent pivotal axes), the tooth space on the sprocket must be increased. To provide this increase of space, the sprocket of the particular track mechanism illustrated by the drawings, is formed with a less number of active teeth. Preferably, an even number of active teeth is provided, all of the teeth being active in succession.

The invention has for its objects, among others, the provision of an improved final drive sprocket wheel adapted to have full bearing contact with the link connecting bushings in an endless track mechanism, which is of sturdy construction, and which can be economically manufactured. Other objects of the invention will become apparent from the following description thereof.

Referring to the drawings:

Fig. 1 is a side elevation of a track-type tractor having an endless track mechanism embodying the instant invention.

Fig. 2 is a schematic plan view illustrating the connections between the tractor body or main frame and the endless track mechanisms.

Fig. 3 is a fragmentary vertical longitudinal section through an endless track mechanism, the endless track being omitted and the sprocket end of the mechanism being shown in elevation.

Figs. 4 and 5 illustrate details of the track sprocket construction, and are fragmentary sections taken respectively in planes indicated by the lines 4—4, 5—5 in Fig. 3.

Fig. 6 is a vertical transverse section through the connection between links of the endless track.

The track-type tractor disclosed herein, for the purpose of illustrating an environment in which our endless track mechanism finds applicability, includes body portion or main frame 21 (Figs. 1 and 2) of any suitable construction, which is movably mounted on similar opposite track mechanisms 22 by means of aligned pivotal connections adjacent one end, and an equalizing mechanism adjacent the other. At the rear of body 21 (Fig. 2) axially aligned stub shafts 23 and 24 are secured therein for providing the pivotal connections with the track mechanisms. Each track mechanism 22 includes track or truck frame 26 having outwardly diverging rear end portions 27 and 28 providing spaced bearing connections with a stub shaft. Track frame 26 of the left-hand track mechanism is hingedly connected to stub shaft 24; and the right-hand track frame is similarly hinged to shaft 23. Adjacent its front end, body 21 is supported on equalizing mechanism 29, preferably in the form of a spring, extending transversely of body 21 and having its ends slidably supported on track frames 26. By virtue of the spaced pivotal connections of track frames 26 with stub shafts 23 and 24, track frames 26 are confined to oscillation in substantially parallel upright planes; equalizing mechanism 29 serving to restrict and equalize such oscillations.

Each endless track mechanism includes an endless self-laying track supported around the associated track frame, by means of a front idler wheel mounted at the front of the track frame and a driving sprocket at the rear thereof; the weight of the tractor being transmitted to the ground stretch of the track through a plurality of weight bearing track rollers running on spaced rails of the track. The driving sprocket serves to propel the tractor over the endless track, and to pick up the track and feed its upper reach forwardly over the front idler wheel which guides the re-laying thereof. If desired, the upper stretch of the track between the front idler and drive sprocket can be supported by suitable track carrier rollers.

An endless track 31 (Fig. 1) extends around each of track frames 26, and has engagement with driving sprocket 32 at the rear of frame 26 and with front idler wheel 33 at the front end thereof. The ground stretch of track 31 is engaged by a plurality of track rollers 34 journalled on frame 26 and transmitting the weight of the tractor to track 31. The upper stretch of track 31 is supported by track carrier rollers 36 suitably mounted on housings 37 and 38 on frame 26. Housing 38 is in the form of a yoke for slidably mounting front idler wheel 33 on frame 26, as described more specifically hereinafter, to provide for movement of the idler under control of a suitable spring recoil mechanism 40 should the track become clogged; such recoil mechanism being preferably of the type disclosed in our assignee's patent to Eberhard No. 2,022,079, dated November 26, 1935.

Driving sprockets 32 for the respective track mechanisms are driven from the tractor engine through suitable transmission mechanism controlled by gear shift lever 41, main clutch lever 42, steering clutch levers 43, and brake pedals 44. The construction of the controls and the transmission mechanism forms no part of the present invention, and will not be described in detail.

Each driving sprocket is provided with an even number of separated teeth spaced apart a distance equal to the pitch (distance between adjacent pivotal axes) of the track links; the space between adjacent teeth or the tooth space being of sufficient size to receive a track bushing at the most desirable angle, without interference from the non-working face of the tooth cooperating to form such tooth space. Moreover, a full width tooth and root face (the root face being the inner face subjected to radial pressure upon engagement of a bushing in the tooth space) of each tooth space are provided to engage substantially the entire width of track bushing available between the links forming the spaced rails of the track; only sufficient clearance existing between the end faces of the teeth and the inner edges of the rails to allow freedom of movement. Sprocket 32 (Fig. 3) includes rim portion 45 having a plurality of spaced apart tooth spaces 46 thereon. Each tooth space is formed by tooth working face 47, inner face or root face 48, and non-working tooth face 49.

To enable strength of each of the separated teeth, but yet lightness of weight of the sprocket, each tooth is formed of spaced tooth projections 50 braced by integral reenforcing web or flange 51 positioned in the space between the tooth projections. Hence, working face 47 of each tooth, which is of full bearing width (Fig. 4), is adequately braced. Tooth space bottom or root face 48 (Fig. 4) absorbs radial thrust which occurs when a track bushing engages the face. Face 48 extends transversely substantially the full width between the links of the endless track, to provide a full bearing surface with the track bushing described hereinafter, and is braced at each end or laterally overhanging portion thereof, by a radially and laterally extending reenforcing web or flange 52. Sprocket 32 is preferably constructed as a unitary metal casting which is subsequently heat treated to provide for strength. During the casting and before heat treatment of the sprocket, end portions 53 (indicated in dotted lines in Figs. 1 and 4) of root face 48 and the inner portions of tooth faces 47 and 49 are formed initially depressed at a slight angle of about 4 degrees with respect to the central portion 54; so that after heat treatment, end portions 53, by virtue of differing rates of metal expansion caused by the presence of flanges 52, are raised substantially even to the central portion 54 to provide an even working surface and full bearing for the track bushings. Thus, each tooth space is characterized by initial end deformations removed by heat treatment.

Track links 107 and 108 (Fig. 6) of each assembly are symmetrical with respect to each other, to thereby form left-hand and right-hand links, respectively, and one pair of reduced width end portions (preferably the front end) of a pair of links forming a link assembly are at the inner sides of the links, and are overlapped or embraced by outer reduced width end portions at the rear of the links of the adjacent pair of links, to provide full width rail joints of butt-lap construction. The inner reduced width end portions are connected by bushing 113 press-fitted in such portions; and the outer reduced end portions are connected by pin 114 journaled in bushing 113 to provide the pivotal connection between adjacent pairs of links. Pin 114 is longer than bushing 113, so that the pin ends can be press-fitted in the outer reduced width end portions; and bushings 113 are of enlarged diameter between the rails. However, increased height of the link and consequent increase in weight thereof, is avoided by providing reduced diameter ends 186 on each bushing 113; such ends being the parts of the bushing press-fitted in the links of each pair. Also, reduced bushing ends 186 enable the pitch line to be maintained a minimum practical distance above the ground.

From the preceding description, it is seen that the final drive sprocket of our invention having full bearing teeth and which is reenforced in the manner described provides a strong construction adapted to have a long life, and that full advantage of this feature is taken by having large diameter bushings adapted to engage such full bearing teeth.

Therefore, we claim as our invention:

1. A driving sprocket for a self-laying endless track comprising a rim portion; separated teeth integral with said rim portion and providing tooth spaces therebetween, each tooth being of a relatively light but strong construction and including spaced substantially radial projections and a reenforcing flange between such projections; the root faces of said tooth spaces being of substantially full width to provide full bearing for bushings which connect links forming part of an endless track; and additional flanges adjacent said rim portion and extending transversely with respect to said teeth flanges for reenforcing the ends of the root faces of the tooth spaces.

2. A driving sprocket for a self-laying endless track comprising spokes; a rim portion integral with said spokes; separated teeth integral with said rim portion and providing tooth spaces therebetween, each tooth being of relatively light but strong construction and including spaced substantially radial projections extending transversely across said rim portion, and a reenforcing flange extending transversely with respect to and between said projections and integral therewith and with said rim portion; the root faces of said tooth spaces being of substantially full width to provide full bearing for bushings which connect links forming part of an endless track; and additional flanges integral with and only on the sides of said rim portion extending transversely with respect to said teeth flanges for reenforcing the ends of the root faces of the tooth spaces.

3. A driving sprocket for a self-laying endless track comprising spokes; a circular substantially even rim portion integral with said spokes; separated teeth projecting from and integral with said rim portion and providing tooth spaces therebetween, the root faces of said tooth spaces being substantially even with the periphery of said rim portion, each tooth being of relatively light but strong construction and including spaced substantially radial projections extending transversely across said rim portion, and a reenforcing flange extending transversely with respect to and between said projections and integral therewith and with said rim portion; the root faces of said tooth spaces being of substantially full width to provide full bearing for bushings which connect links forming part of an endless track; and additional flanges integral with said rim portion extending transversely with respect to said teeth flanges for reenforcing the ends of the root faces of the tooth spaces.

4. A driving sprocket for a self-laying endless track comprising spokes; a circular substantially even rim portion integral with said spokes; separated teeth projecting from and integral with said rim portion and providing tooth spaces therebetween, the root faces of said tooth spaces being substantially even with the periphery of said rim portion, each tooth being of relatively light but strong construction and including spaced substantially radial projections extending transversely across said rim portion, and a reenforcing flange extending transversely with respect to and between said projections and integral therewith and with said rim portion; the root faces of said tooth spaces being of substantially full width to provide full bearing for bushings which connect links forming part of an endless track; and additional flanges integral with and only on the sides of said rim portion extending transversely with respect to said teeth flanges for reenforcing the ends of the root faces of the tooth spaces.

OSCAR L. STARR.
WALTER GROTHE.
HARMON S. EBERHARD.